United States Patent

Burnett-Johnston

[11] 4,267,622
[45] May 19, 1981

[54] HOSE CLIP APPARATUS

[76] Inventor: Roy L. Burnett-Johnston, 270 Carlton Rd., Gidea Park, Romford, Essex, England

[21] Appl. No.: 63,723

[22] Filed: Aug. 6, 1979

[51] Int. Cl.³ .............................................. F16H 33/00
[52] U.S. Cl. .............................................. 24/274 WB
[58] Field of Search ..................... 24/19, 274 WB, 278

[56] References Cited

U.S. PATENT DOCUMENTS

| | | | |
|---|---|---|---|
| 2,907,086 | 10/1959 | Ord | 24/19 |
| 3,035,319 | 5/1962 | Wolff | 24/19 |
| 3,276,090 | 10/1966 | Nigon | 24/274 WB |
| 3,401,437 | 9/1968 | Christophersen | 24/274 WB |

FOREIGN PATENT DOCUMENTS 1269433  5/1968  Fed. Rep. of Germany ..24/274 WB
1379782 10/1964  France .......................... 24/274 WB Primary Examiner—Roy D. Frazier
Assistant Examiner—Peter A. Aschenbrenner
Attorney, Agent, or Firm—Fulwider, Patton, Rieber, Lee & Utecht

[57] ABSTRACT

Clip apparatus for use in securing a member such as a hose to a pipe or the like. The apparatus includes a housing secured to one end of a spirally configured flexible strip. A rotatable driving member carried by the housing is formed with threads engageable with complementary threads formed on the strip. Rotation of the driving member causes expansion and contraction of the strip relative to the pipe or the like. Slidable movement of the driving member disengages its threads from those of the strip.

10 Claims, 4 Drawing Figures

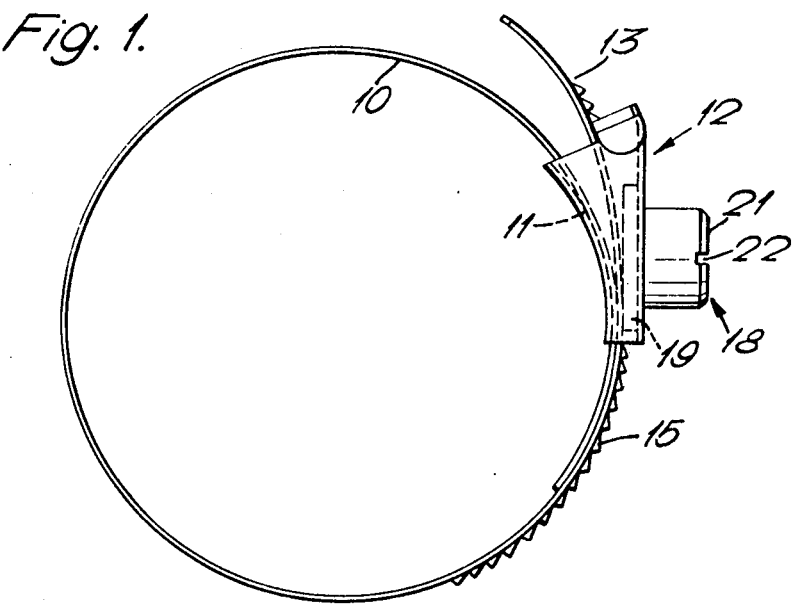
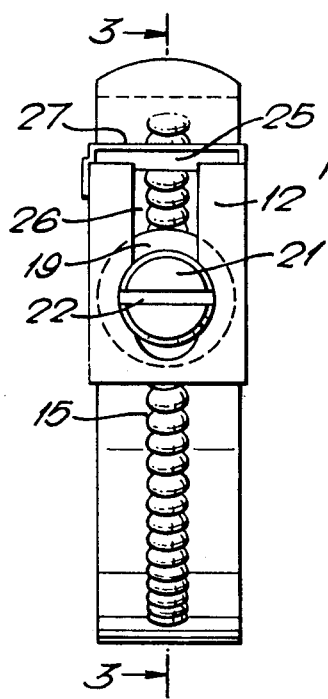

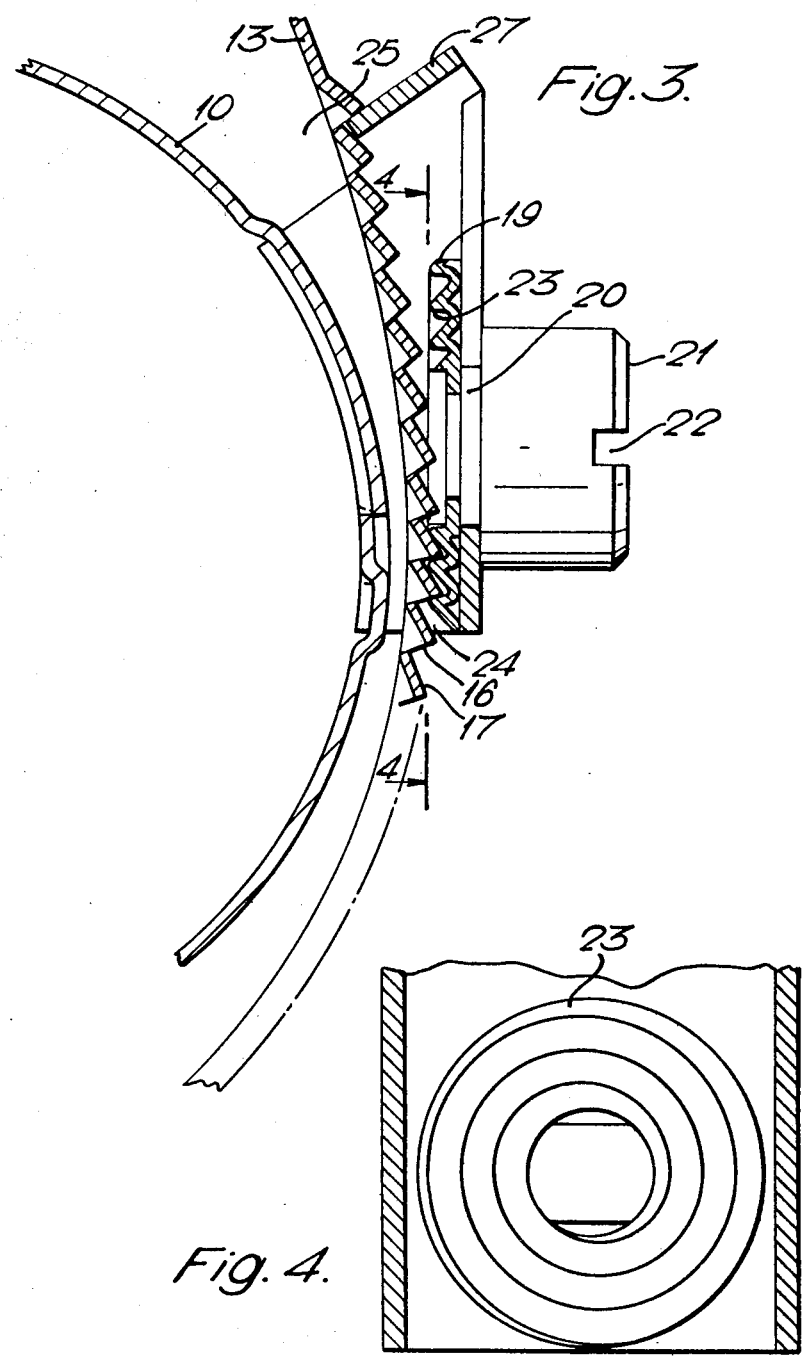

HOSE CLIP APPARATUS

This invention relates to clips and especially to clips of the kind comprising a spiral strip, one end of the strip being secured to a housing, the other end of the strip passing through the housing, and a driving member mounted in the housing and engageable with slots or slits in the strip so that rotation of the driving member in one direction causes the spiral to contract to grip anything placed within the spiral and rotation in the other direction causes the spiral to expand. Such clips are frequently used to secure hoses to rigid pipes, and will be referred to hereinafter as clips of the kind described.

The invention provides a clip of the kind described in which the driving member has a substantially flat face abutting the strip, the flat face carrying teeth or threads which are so shaped that they engage the slots or slits in the strip and rotation of the driving member about an axis normal to the flat face causes expansion and contraction of the spiral, and in which the driving member is slidable in the housing between a first position in which the threads or teeth engage the slots or slits in the strip, and a second position in which the threads or teeth are disengaged from the slots or slits.

The driving member may have on its flat face a single spiral thread, in the manner of a scroll, with the strip passing over the centre of the face and abutting the face only on one side of the centre of the face.

Preferably the flat face is circular.

It is preferred that the faces of the teeth or threads of the driving member which are under load when the spiral is contracted are perpendicular to the said flat face, the other faces of the teeth being oblique to the said flat face.

It is further preferred that the strip has slots of a complementary form. The free end of the strip may be arranged to engage a portion of the housing with the slots acting in the manner of a ratchet to prevent expansion of the spiral unless the free end of the strip is first moved out of engagement with the said portion of the housing.

The slots may be formed in the strip by pressing.

The strip may, for example, be of steel, stainless steel or, monel metal or a plastics material.

The pitch of the thread or teeth on the driving member may lie within the range 1 T.P.I. to 36 T.P.I. A preferred pitch is 14 T.P.I.

The depth of the thread or teeth may be within the range 0.005" to 0.100". A preferred depth is 0.045" but depths of 0.060" and 0.072" would also be particularly suitable.

By way of example, a specific embodiment of a clip according to the invention will now be described with reference to the accompanying drawings in which:

FIG. 1 is a side view of a clip;

FIG. 2 is an enlarged plan view of one end of the strip of FIG. 1 showing the housing in plan;

FIG. 3 is an enlarged section through the clip of FIGS. 1 and 2; and

FIG. 4 is an underplan of the driving member.

Referring to FIGS. 1 to 4 of the drawings, a clip according to the invention comprises a spiral steel strip 10 having one end portion 11 secured in a housing 12, the other end portion 13 passing slidably through the housing. On one face the strip 10 has a plurality of teeth or thread portions 15. These thread portions have a buttress form i.e., they have one substantially perpendicular face 16, the other face 17 being inclined (FIG. 3). There are 14 threads per inch and the tooth depth is 0.045".

Also mounted within the housing is a driving member 18. Member 18 comprises a disc 19 to which is swaged a shaft 20. The shaft 20 has a head 21 having a screwdriver slot 22 therein. On the flat face of the disc 19 is a spiral thread (FIG. 4) having the same form as the threads 15.

The housing 12 has openings 24 and 25 therein for the strip. It also has a slot open at one end which slot 26 receives the shaft 20 and has a 'wrap around' front face which closes the open end of the slot 27 adjacent aperture 25.

The clip is assembled as shown in FIG. 1, the end 11 of the strip being secured in the housing by two detents struck out of the strip material. The disc 19, by virtue of the slot 26 receiving the shaft 20, can be moved between the position shown in FIGS. 1 and 3 in which the threads 15 and 23 engage, and a position in which the disc lies at the upper part of the housing as viewed in FIGS. 1 and 3 the threads 15 and 23 being disengaged. While the strip 10 passes centrally over the disc 19 the projecting front face of the housing 27 ensures that the strip only engages the disc 19 on one side of the centre of the disc. The threads 15 of the strip engage the front face 27 in the same way that a ratchet member engages a pawl.

In use the disc 19 is moved to a position in which threads 15 and 23 are disengaged. End 13 of the strip 10 is then manually disengaged from front face 27 of the housing by bending the end 13 towards the centre of the spiral and the end 13 can then be slid through the housing downwardly as viewed in FIGS. 1 and 3 to increase the diameter of the spiral. The spiral is then placed over the article which it is desired to clamp. This may for example be a piece of rubber hose which has been passed over a metal pipe. If necessary the end 13 of the strip may be removed completely from the housing so that the spiral can be wound round the hose rather than threaded over the hose.

The end 13 of the strip is then pulled back through the housing until the spiral closely embraces the article to be clamped. The disc 10 is then moved into the position shown in FIGS. 1 and 3 in which the threads 15 and 23 engage and the spiral can then be firmly tightened on to the article to be clamped by turning the disc through the medium of shaft 20 and screwdriver slot 22. The action of the vertical faces of the threads tends to hold the disc 19 in the position shown in FIG. 1.

When it is desired to release the clip the disc 19 is given a few turns in a direction to slacken the spiral and once a little play has been obtained the disc 19 may be moved out of engagement with the strip 10 and the end 13 can be manually fed through the housing.

The teeth on the disc 19 may be produced by a pressing operation, which is a relatively inexpensive operation compared with machining. Furthermore by pressing the teeth on the strip 10 it is possible to produce a clip in which there is a greater contact area between the driving and driven members than in a clip of similar size employing a known screw. In known clips the slits or slots in the strip material are generally produced by hobbing. It is difficult or impossible to produce a hobbing tool having a diameter as small as the driving screw. The radius of the bottom of the slits or slots is therefore generally greater than the radius of the threads and the area of contact is reduced. With the arrangement according to the invention this problem is avoided. For any given size of clip the ratio of contact area in a clip according to the invention to contact area in a known clip may be of the order of 0.3287 to 0.2170.

Furthermore deeper teeth may be provided in the clip according to the invention and this, coupled with the improved contact area, makes it less necessary for the driving member to be tightly pressed against the strip by the housing. This feature makes the clip forming the subject of this example less prone to jamming should the threads become dirty or rusty, and facilitates movement of the disc 19 between the two positions mentioned above.

When the clip forming the subject of this example is in the tightened position the interengagement between the threads on the end 13 and the front face 27 on the housing provide an additional safeguard against slipping of the clip. This is particularly advantageous where the clip is to be used on an automobile or other machinery where vibration might cause undesirable rotation of the disc 19.

It is not necessary for the strip 10 to have teeth or threads along its entire length. In the above example the teeth extend for 1½" along the end 13 only. The overall length of the strip is of the order of 4 or 5 inches.

The press forming of the teeth or threads on the strip 10 and disc 19 may work harden the working surfaces.

With the clip forming the subject of this example the load which will be applied to the clip by a screwdriver during tightening of the clip will be substantially radial. With some known clips the force applied is tangential. The clip therefore tends to slip away from the screwdriver by rotating about the centre of the spiral.

What I claim is:
1. Clip apparatus, comprising:
    a housing;
    a flexible spiral shaped strip having its first end secured to said housng and formed along its outer surface with a plurality of teeth, the end of said strip opposite that secured to said housing extending through said housing; and
    a rotatable driving member slidably carried by said housing for longitudinal movement relative to said strip between first and second positions, said driving member having a substantially flat face formed with a second plurality of teeth so shaped that they engage the teeth of said strip when said driving member is disposed in its first position and rotation of said driving member about an axis normal to said flat face causes expansion and contraction of the spiral shape of said strip, with the teeth of said driving member being disengaged from the teeth of said strip when said driving member is moved longitudinally towards the second end of said strip to the second position of said driving member so as to permit the spiral shape of the strip to be adjusted independently of rotation of the driving member.

2. A clip as claimed in claim 1, wherein the driving member has on its flat face a single spiral thread, in the manner of a scroll, with the strip passing over the center of the face and abutting the face only on one side of the center of the face.

3. A clip as claimed in claim 1, wherein the flat face is circular.

4. A clip as claimed in claim 1, wherein the faces of the teeth of the driving member which are under load when the spiral is contracted are perpendicular to the said flat face, the other faces of the teeth being oblique to the said flat face.

5. A clip as claimed in claim 1, wherein the strip has teeth of complementary form to the teeth of the driving member.

6. A clip as claimed in claim 1, wherein the strip teeth are formed in the strip by pressing.

7. A clip as claimed in claim 2, wherein the faces of the teeth or threads of the driving member which are under load when the spiral is contracted are perpendicular to the said flat face, the other faces of the teeth being oblique to the said flat face.

8. A clip as claimed in claim 2, wherein the flat face is circular.

9. A clip as claimed in claim 2, wherein the strip has teeth of complementary form to the teeth of the driving member.

10. A clip as claimed in claim 3, wherein the faces of the teeth of the driving member which are under load when the spiral is contracted are perpendicular to the said flat face, the other faces of the teeth being oblique to the said flat face.

* * * * *